(12) United States Patent
Hubner et al.

(10) Patent No.: US 9,277,101 B2
(45) Date of Patent: Mar. 1, 2016

(54) METHOD AND SYSTEM FOR GENERATING INTERPOLATIONS OF CAPTURED VIDEO CONTENT

(75) Inventors: Paul V. Hubner, McKinney, TX (US); Robert A. Clavenna, II, Lucas, TX (US); Kristopher A. Pate, Flower Mound, TX (US); Steven T. Archer, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 425 days.

(21) Appl. No.: 13/334,680

(22) Filed: Dec. 22, 2011

(65) Prior Publication Data

US 2013/0162781 A1  Jun. 27, 2013

(51) Int. Cl.
*H04N 13/02* (2006.01)
*H04N 5/222* (2006.01)
*H04N 13/00* (2006.01)

(52) U.S. Cl.
CPC ......... *H04N 5/2224* (2013.01); *H04N 13/0011* (2013.01); *H04N 13/0242* (2013.01)

(58) Field of Classification Search
CPC ............ H04N 5/2224; H04N 13/0011; H04N 13/0242
See application file for complete search history.

(56) References Cited

U.S. PATENT DOCUMENTS

| | | | |
|---|---|---|---|
| 2005/0193421 A1* | 9/2005 | Cragun | 725/80 |
| 2008/0297624 A1* | 12/2008 | Shingu et al. | 348/231.99 |
| 2009/0238409 A1* | 9/2009 | Hahn et al. | 382/103 |
| 2010/0007751 A1* | 1/2010 | Icho et al. | 348/222.1 |
| 2011/0045812 A1* | 2/2011 | Kim et al. | 455/418 |
| 2012/0249730 A1* | 10/2012 | Lee | 348/38 |

* cited by examiner

Primary Examiner — Tat Chio

(57) ABSTRACT

An approach for enabling users to generate an interpolated view of content based on footage captured by multiple cameras is described. An interpolation platform receives a plurality of images from a plurality of video cameras providing overlapping fields of view. A camera angle that is different from angles provided by the plurality of cameras is selected. The interpolation platform then generates an interpolated image corresponding to the selected camera angle using a portion or all of the plurality of images from the plurality of cameras.

19 Claims, 11 Drawing Sheets

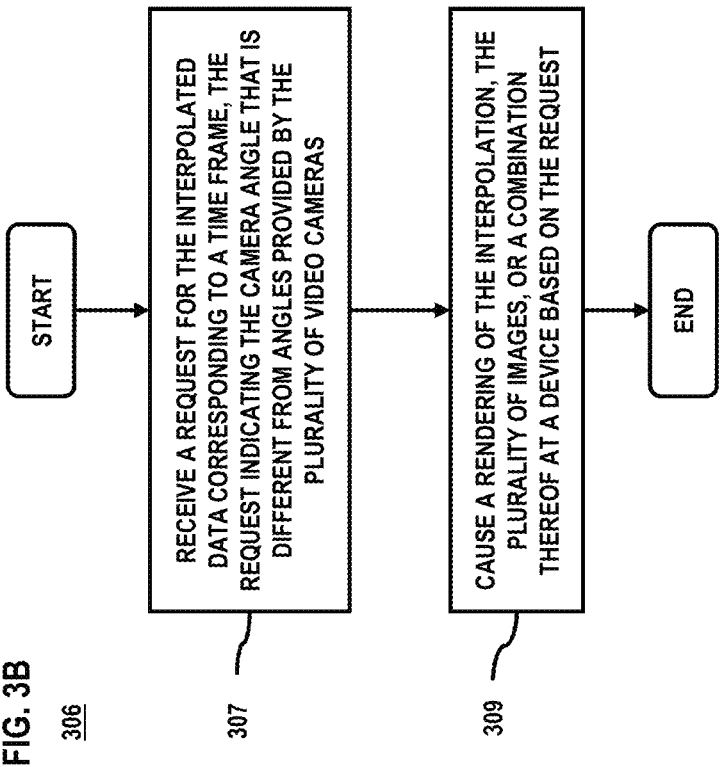
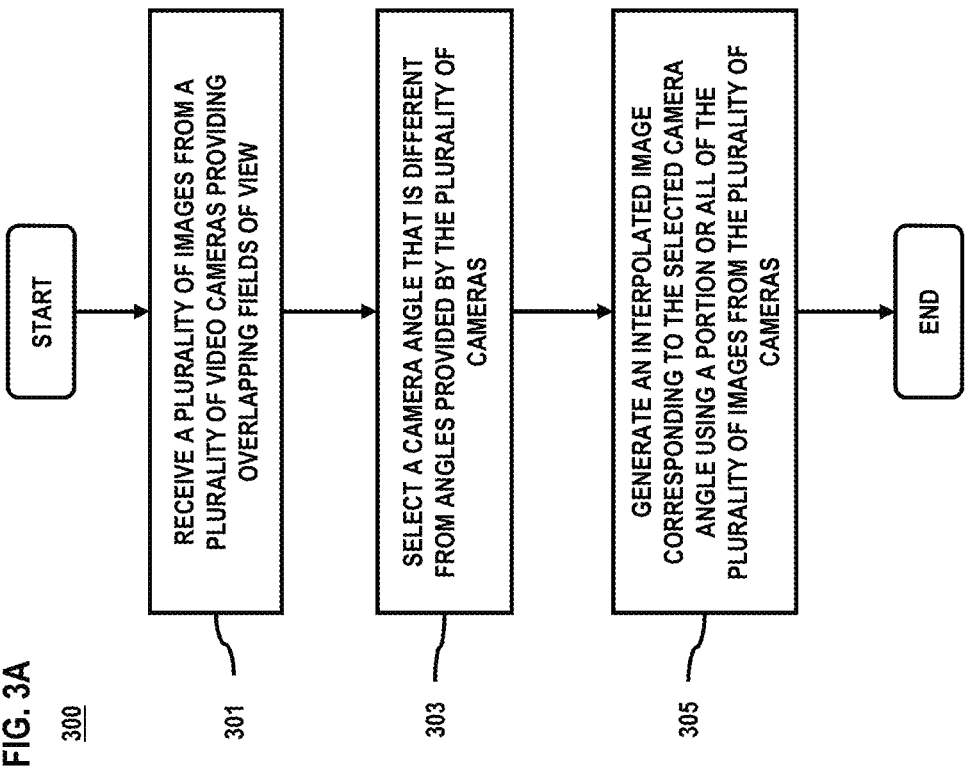

312

310

320

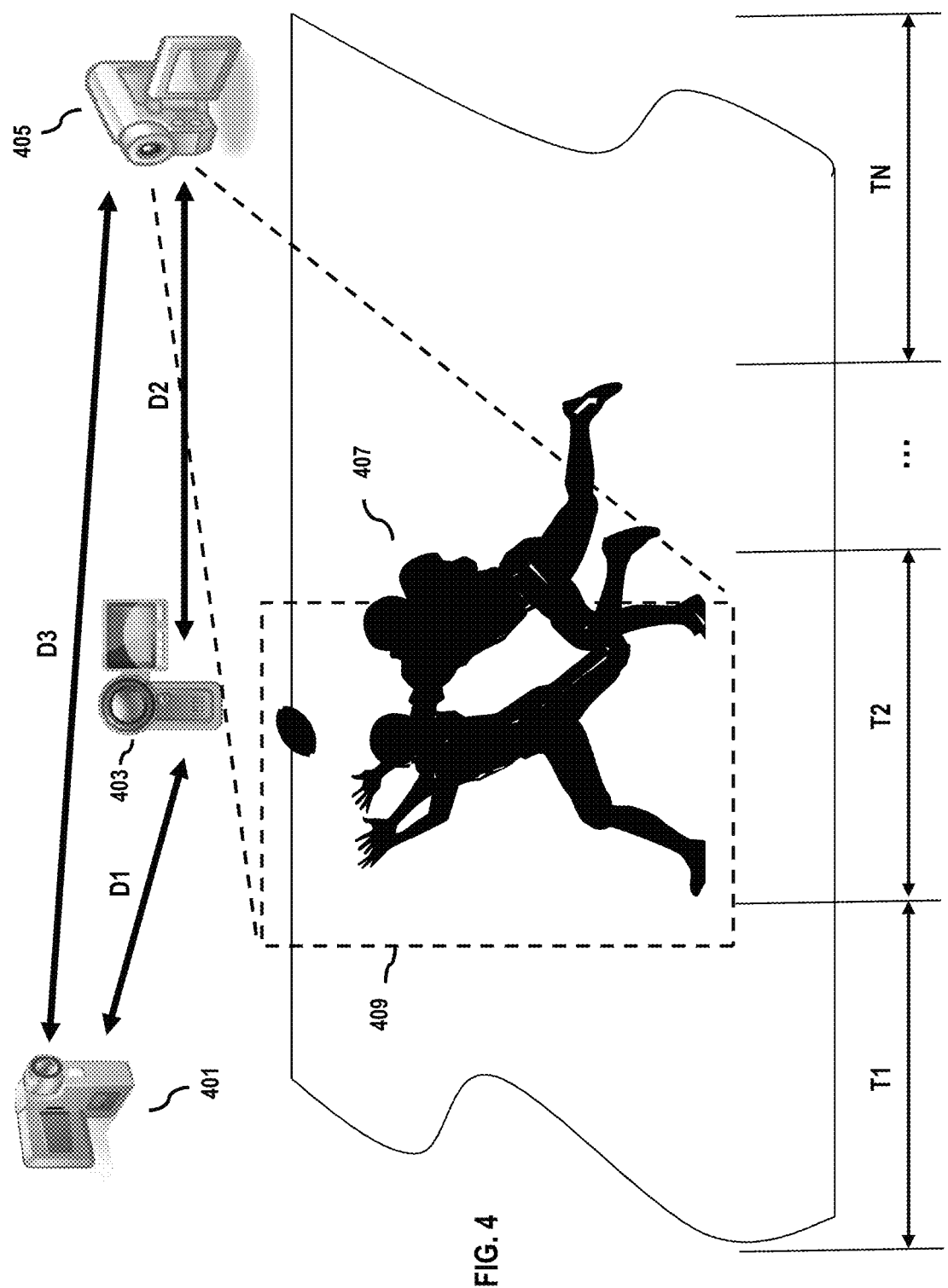

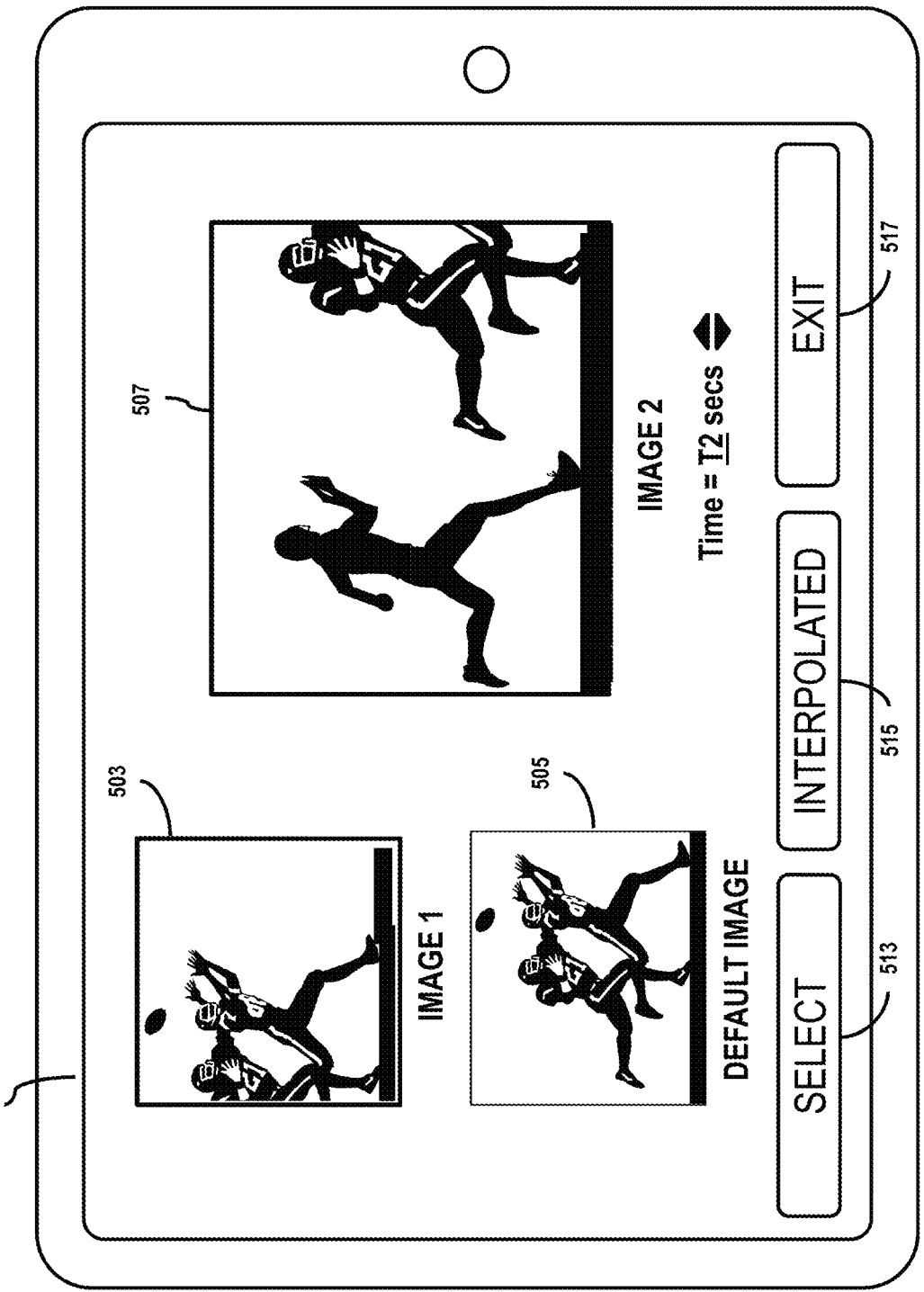

METHOD AND SYSTEM FOR GENERATING INTERPOLATIONS OF CAPTURED VIDEO CONTENT

BACKGROUND INFORMATION

Service providers are continually challenged to deliver value and convenience to consumers by providing compelling network services and advancing the underlying technologies. One area of interest has been the development of services and technologies for enabling users to view content from multiple perspectives, i.e., image content corresponding to captured video footage. In a typical multi-camera system, each camera is positioned at different angles to capture a recording of a common subject from a unique perspective. The cameras are moved however in order for the multi-camera system to capture any other perspectives of the subject. Unfortunately, moving the cameras is not always feasible depending on the recording environment, venue type, etc. Furthermore, the size of the equipment can make it difficult to move and active recording concurrently.

Based on the foregoing, there is a need for enabling users to generate an interpolated view of content based on footage captured by multiple cameras.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3E are flowcharts of processes for enabling users to generate an interpolated view of content based on footage captured by multiple cameras, according to various embodiments;

FIG. 4 is a diagram of a subject being recorded from various perspectives by different cameras of a multi-camera system, according to one embodiment;

FIGS. 5A-5C are diagrams of user interfaces utilized in the processes of FIGS. 3A-3E, according to various embodiments;

DESCRIPTION OF THE PREFERRED EMBODIMENT

An apparatus, method and software for enabling users to generate an interpolated view of content based on footage captured by multiple cameras is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to video content, it is contemplated that these embodiments have applicability to any data protocols, methodologies or systems for processing audio, multimedia, images and the like.

Figure 1:
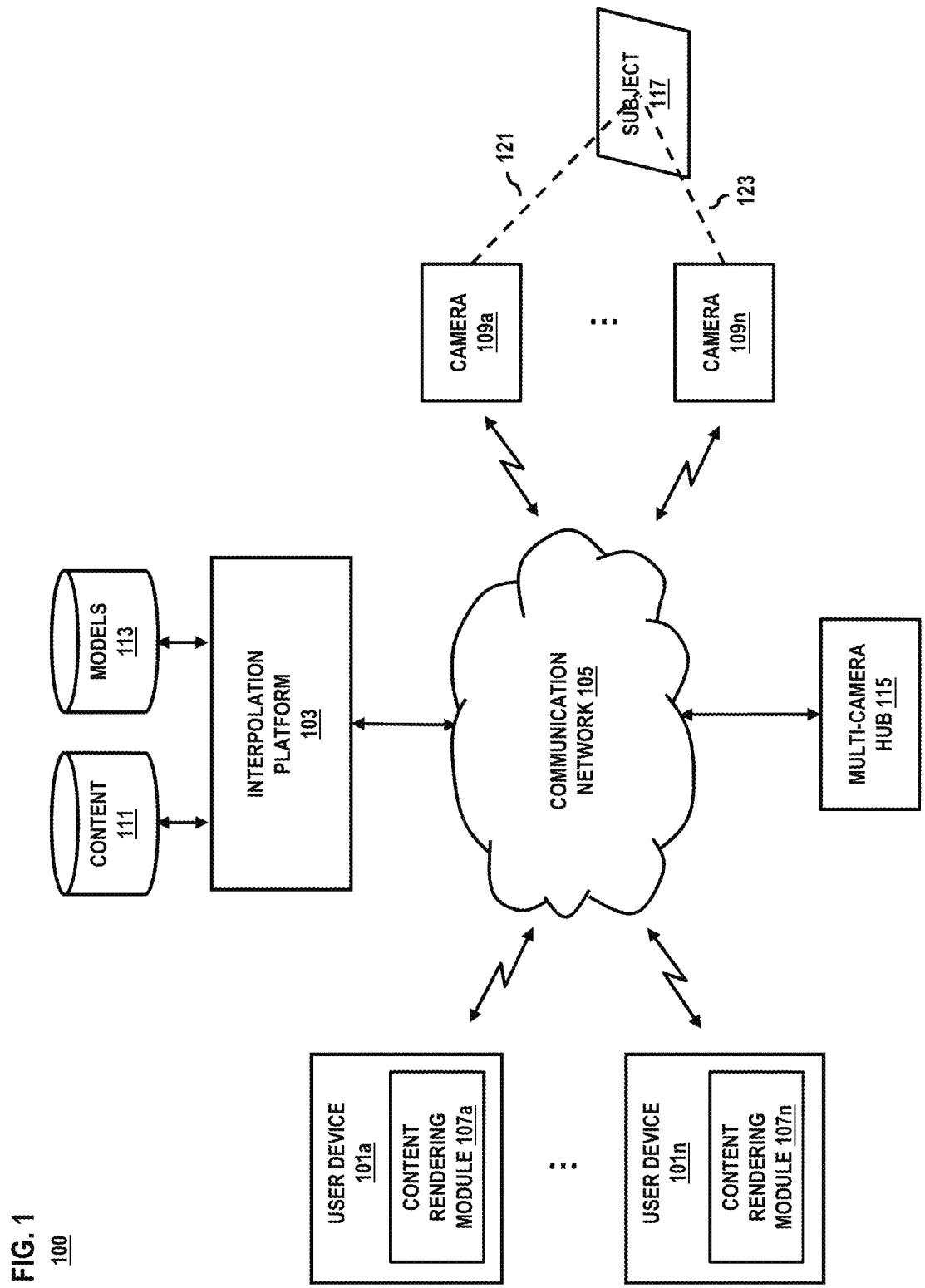
FIG. 1 is a diagram of a system for enabling users to generate an interpolated view of content based on footage captured by multiple cameras, according to one embodiment.

FIG. 1 is a diagram of a system for enabling users to generate an interpolated view of content based on footage captured by multiple cameras, according to one embodiment. System 100 includes an interpolation platform 103 that is configured to operate in connection with multiple cameras 109a-109n, including those that are implemented as part of a multi-camera system. For the purpose of illustration, the cameras 109a-109n are video cameras capable of capturing/recording video data. The interpolation platform 103 produces an interpolation of an image based on processing of captured video data in order to provide a unique perspective of the captured data to a user.

As noted, in a multi-camera system, cameras are employed to simultaneously record a subject at varying angles, and hence, from various different perspectives. For example, a first camera can video record a subject or scene from a first angle, a second camera from a second angle, and a third camera from a third angle, etc. Each angle provides to a different viewpoint of the subject and furthermore, a relative distance is maintained between respective cameras for recording content. In addition to the cameras 109a-109n, the system can include a multi-camera hub 115 that serves as a signal processor, computer, server or other system for coordinating the actions of the cameras 109a-109n, receiving and/or processing video data, etc. Multi-camera systems may be used for video recording, image capture, or the like.

Unfortunately, a camera is physically moved from a current angular position relative to the subject to another in order to capture data from a different perspective. As mentioned, this is not always feasible, however, depending on the recording environment, venue type, etc. For example, a concert or sporting event may feature many people and physical obstacles that make it difficult to move the equipment. Furthermore, the size of certain equipment does not lend it to easily being moved. Still further, those users having access to the recorded content have limited ability to view any other perspectives of the content beyond that as originally captured.

To address this issue, system 100 presents an interpolation platform 103 that is configured to allow viewers of the content to render the captured data to their devices 101a-101n from multiple different perspectives; including those perspectives not originally captured by the plurality of cameras 109a-109n. Hence, an interpolated view of the content is generated on demand at a user specified angle based on the data captured originally by one or more of the cameras 109a-109n. The content 111 as captured, including video and/or image content, is maintained by the interpolation platform 103 and processed based on one or more vector analysis models 113. The models 113 may be used to determine differences between content in order to formulate an interpolation based on the user selection. It is also noted that the models 113 may be integrated for use with one or more video decomposition, rendering, signal processing, segmentation, and other processing and/or content generation techniques.

In certain embodiments, the interpolation platform 103 is configured to perform one or more of the following processing techniques for rendering an interpolation of the content 111: (1) determine vector differences between the content as captured by different cameras 109a-109n at a common time frame based on the different angles at which the cameras 109a-109n are positioned; (2) storing the content and corresponding vector differences for subsequent analysis; (3) receiving a request for a rendering of the content from an alternate angle, i.e., an angle that is different than that of the different cameras 109a-109n; and (4) generating the interpolated convent (image) that corresponds to the request based on processing of the vector differences as determined relative to the alternate angle. The platform 103 therefore renders and interpolation of the content, i.e., an image, that is representative of the content from the perspective of the alternate angle. For illustration purposes, a subject 117 as depicted within the image appears to a display of a user device 101a-101n at the angle corresponding to the selection. It is noted that the platform 103 may also calculate one or more vector magnitudes, scalars, etc., in executing a requisite computation for generating an interpolated view.

Of note, the interpolation platform 103 combines the multiple determined camera deltas into a difference vector between the cameras that can then be subsequently interpolated to any arbitrary spot between the physical devices, i.e., in a manner similar to inter-frame video compression of the like. Consequently, the cameras 109a-109n need not be in a regularly ordered array as long as they know their positional relationship to each other. Information regarding the relative location, position and/or distance of the cameras 109a-109n can be maintained by the multi-camera hub 115, conveyed to the interpolation platform 103 for enabling vector computation, or a combination thereof. Optimal placement of the cameras, such as relative to a common 2D plane, may be determined by the multi-camera hub 115 accordingly.

In certain embodiments, the interpolation platform 103 presents a user interface for enabling a user to indicate the specific perspective, view and/or angle they want content to be rendered from. For example, the user may be presented with a default image, such as that captured by one of the cameras 109, for representing a particular frame of content to view. In another example, the user may also be presented with the other images corresponding to the same timeframe as captured by different cameras. The images may be presented as one or more thumbnails, which upon selection result in an expanded view.

In addition, the user interface may feature various controls for enabling a user to generate a custom interpolated view based on the one or more images presented for access to the user as mentioned above. Hence, instead of viewing the one or more original images, the user can select an interpolated view or sweep between the two endpoint views as captured via cameras 109a and 109n; thus directing the interpolation platform 103 to vary the magnitude of the difference vector relative to the angle between the two endpoint cameras.

Under this scenario, the selection is any angle or perspective that lies between opposing cameras of the multi-camera system positioned for capturing data regarding a subject 117 or scene of common interest (e.g., a sporting event, political rally, wedding ceremony, object or group thereof) during a relative common time frame. For example, a camera 109a may record the subject 117 based on a line of view 121 correspond to a first angle while camera 109n records the subject 117 based on a line of view 123 corresponding to a second angle. Each camera captures a multitude of images for providing an overlapping field of view of the subject 117. Consequently, the interpolated content as rendered by the platform 103 pursuant to a user selection of a desired line of view corresponds to or is representative of a view from anywhere between the endpoint cameras, i.e., 109a and 109n, as they record/image the subject 117. As noted previously, the content rendered by the platform 103 can be an image conforming to a particular file format suitable for viewing by respective user devices 101a-101n.

In certain embodiments, the user may also select any multiple interpolated positions between cameras 109a-109n for rendering of a particular view. For example, a first second and third view/angle between endpoint cameras 109a and 109n can be selected by the user via the user interface. Hence, the interpolations generated with respect to the first, second and third angles are processed further by the interpolation platform 103 to generate a final three dimensional interpolated view. Still further, a four dimensional (holographic) view may also be constructed based on the number of selected data points corresponding to the various interpolated views. Under this scenario, the parallax—i.e., amount of displacement or difference in the apparent position of the subject 117 as viewed along different lines of sight—is adjusted dynamically by the user via the interface. Thus, the interpolation platform 103 enables the rending of standard two-dimensional as well as multi-dimensional content. More regarding the user interface rendered by the interpolation platform 103 for enabling access to various interpolations of content is discussed more fully later on with respect to 5A-5C.

In another embodiment, the interpolation platform 103 enables the user to automatically trigger the calculation of vector differences of all the other cameras 109, e.g., relative to the camera that captured the default image, relative to each other, etc. For example, a camera 109f (not shown) may be the default camera, while the other cameras 109a and 109n are likewise positioned for viewing the subject 117. Based on this calculation, the interpolation platform 103 maintains the optimal vectors (i.e., those of minimal difference) between the many cameras to one another. Under this approach, the minimal vector is the vector to its closest neighbors in every direction, wherein the minimal vector results in a more accurate interpolation.

Subsequently, a datagram (e.g., data packet) of information includes the primary camera; and the difference vectors between the primary camera and the other cameras are generated and transmitted to the user via the communication network 105. The datagram may include frame synchronization data, i.e. a sequence of bits or symbols, corresponding to respective captured time frames of content by the different cameras 109a-109n. The frame synchronization data enables a receiver of the datagram to detect the beginning and end of the datagram in the stream of symbols or bits. As such, the datagram is received by a content rendering module 107 of a requesting user device, such as for enabling rendering of an interpolated image via a user interface upon demand.

In certain embodiments, the content rendering module 107 of respective devices 101 is an executable for receiving the content and subsequently decoding the stream of received content based on the bit information. The content rending module 107 is also configured to process and present the corresponding content, based on the requisite sequence, as video content, image content and the like. Presentment is performed in connection with the various application programming interface (API) executions of the requesting user device 101. Of note, the interpolation platform 103 interacts with a content rendering module 107 of a device using various known and still developing data transmission and frame synchronization protocols and techniques. This can include, for example, those techniques for enabling the rendering to a user interface—i.e., a browser application—as it is streamed via the communication network 105. More regarding generation of the datagram for conveyance of interpolated content is discussed more fully later on with respect to FIG. 2.

It is noted that user devices 101a-101n may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the user devices 101a-101n can support any type of interface for supporting the presentment or exchanging of data. In addition, user devices 101a-101n may facilitate various input means for receiving and generating information, including touch screen capability, keyboard and keypad data entry, voice-based input mechanisms and the like. Any known and future implementations of user devices 101 are applicable.

In certain embodiments, user devices 101a-101n, the interpolation platform 103 and other elements of system 100 may be configured to communicate via a communication network 105. The communication network 105 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, the data network may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication network 105 may embody circuit-switched and/or packet-switched networks that include facilities to provide for transport of circuit-switched and/or packet-based communications. It is further contemplated that network 105 may include components and facilities to provide for signaling and/or bearer communications between the various components or facilities of system 100. In this manner, the communication network 105 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101a-101n may be configured to establish peer-to-peer communication sessions with each other using a variety of technologies—near field communication (NFC), Bluetooth, ZigBee, infrared, etc. Also, connectivity can be provided via a wireless local area network (LAN). By way of example, a group of user devices 101a-101n may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 105 as facilitated via a router.

Figure 2:
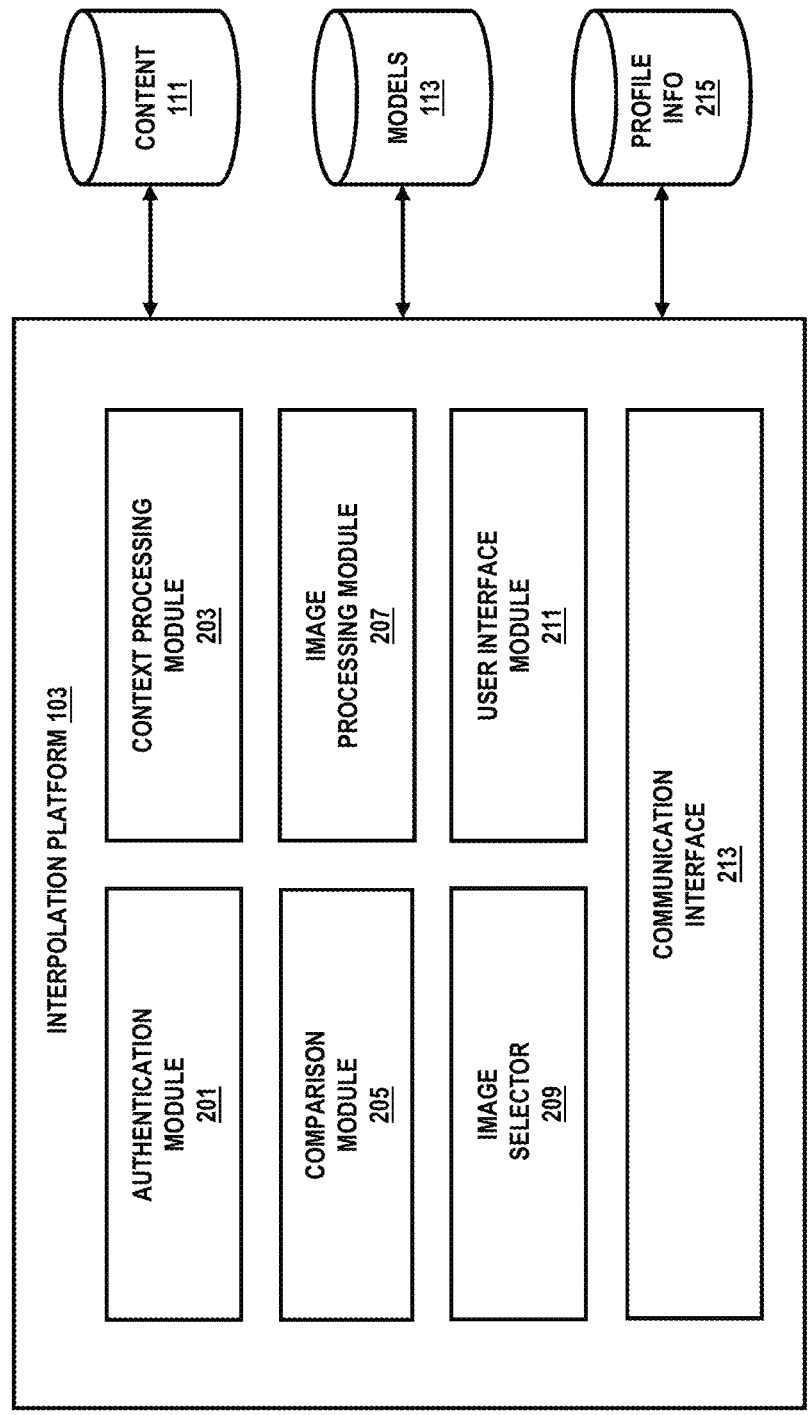
FIG. 2 is a diagram of an interpolation platform utilized in the system of FIG. 1, according to one embodiment.
Figure 3D:
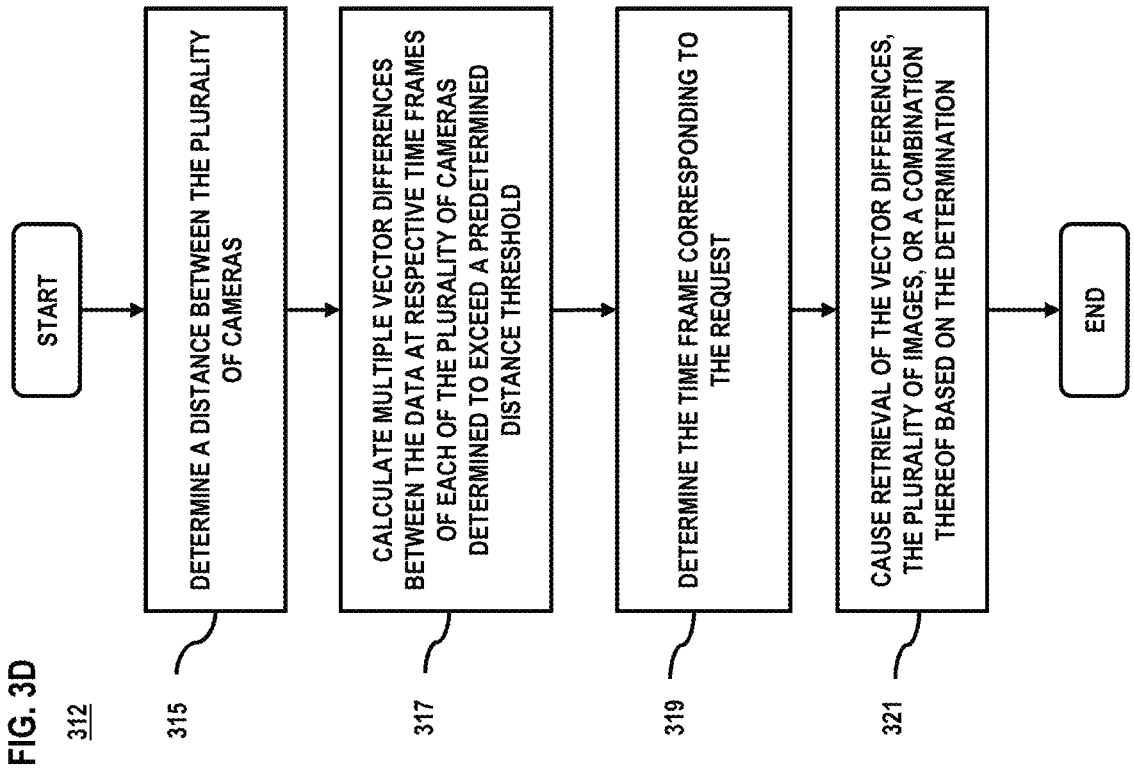
Figure 3C:
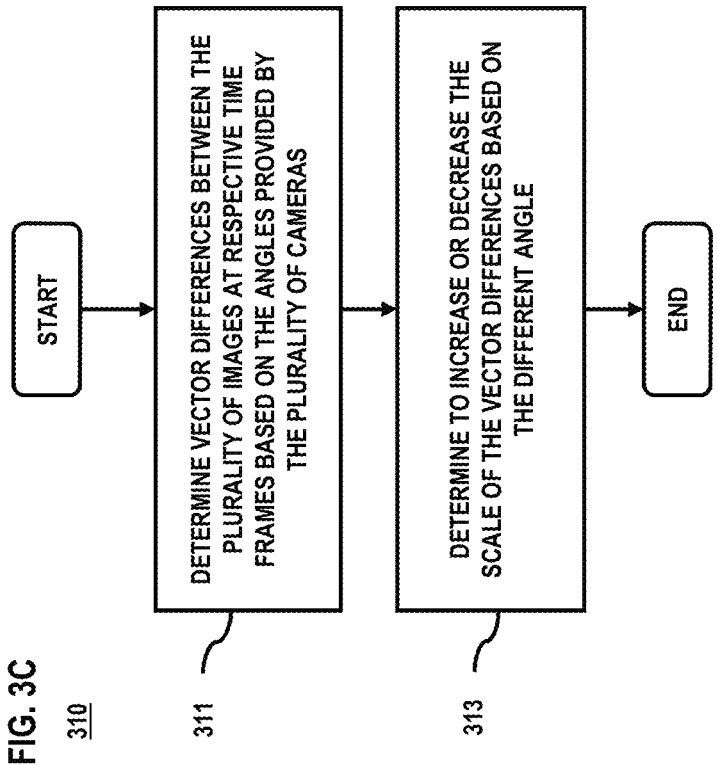
Figure 3E:
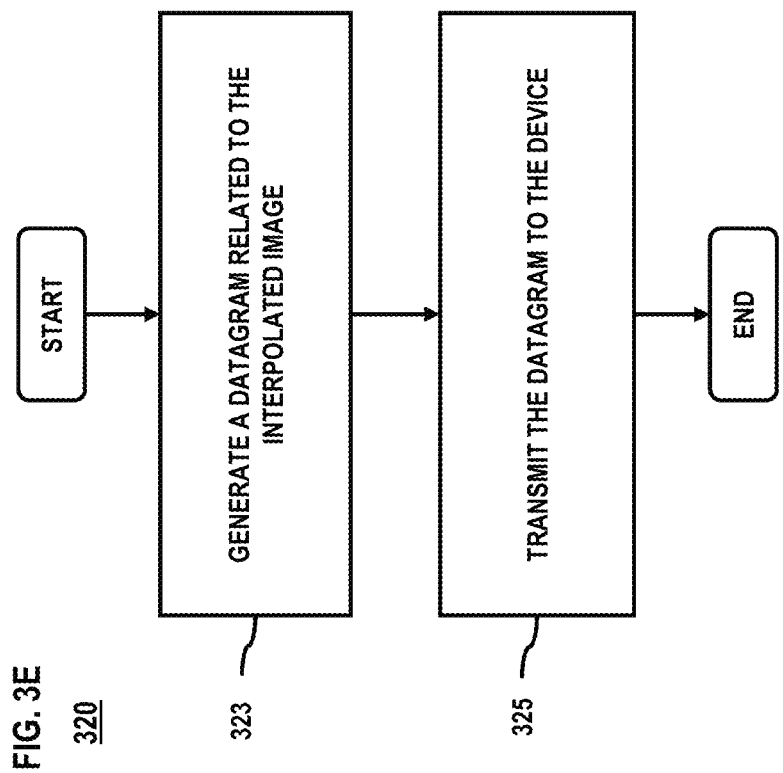

For the purposes of explanation, the devices 101a-101n are configured to communicate with the interpolation platform 103 to enable on-demand access to and rendering of varying interpolations of captured content. In one embodiment, the interpolation platform 103 is offered by a service provider as a managed or hosted solution. Under this approach, the interpolation platform 103 enables any one of the user devices 101a-101n to generate an interpolated view of select content, based on a specification of a desired angle or perspective, using wireless communications. Alternatively, the interpolation platform 103 is directly integrated for execution by the user device—i.e., as a combination of one or more modules that interact to provide the above described features. FIG. 2 is a diagram of an interpolation platform utilized in the system of FIG. 1, according to one embodiment.

For the purpose of illustration, the interpolation platform 103 includes various executable modules for performing one or more computing, data processing and network based instructions that in combination provide a means of enabling users to generate an interpolated view of content based on footage captured by multiple cameras. Such modules can be implemented in hardware, firmware, software, or a combination thereof. By way of example, the interpolation platform 103 may include an authentication module 201, context processing module 203, comparison module 205, image processing module 207, image selector module 209, a user interface module 211 and a communication interface 213.

In addition, the interpolation platform 103 also maintains content (e.g., video, images) in a content database 111, one or more models (e.g., for performing vector analysis) in a models database 113 and profile data regarding one or more users subscribed to the interpolation platform 103 in a profile database 215.

In one embodiment, an authentication module 201 authenticates users and user devices 101a-101n for interaction with the interpolation platform 103. By way of example, the authentication module 201 receives a request to subscribe to the interpolation platform 103 for enabling access content as captured and/or interpolations thereof. The subscription process may include enabling a preferred perspective, activation of one or more signal processing settings, etc. These settings are appropriately established by the authentication module 201. Preferences and settings information may be referenced to a specific user, user device, or combination thereof, and maintained as profile data 215.

The authentication process performed by the module 201 may also include receiving and validating a login name and/or user identification value as provided or established for a particular user during a subscription or registration process. The login name and/or user identification value may be received as input provided by the user from the user device 101 or other device via a graphical user interface to the platform 103 (e.g., as enabled by user interface module 211). Registration data for respective subscribers, which contains pertinent user or device profile data, may be cross referenced as part of the login process. Alternatively, the login process may be performed through automated association of profile settings maintained as profile data 215 with an IP address, a carrier detection signal of a user device, mobile directory number (MDN), subscriber identity module (SIM) (e.g., of a SIM card), radio frequency identifier (RFID) tag or other identifier. Still further, the authentication module 201 is also configured to receive requests from various devices for accessing interpolated content, such as by way of the user interface module 211. This may include, for example, receipt of an input for specifying a desired perspective and/or angle for rendering of an interpolated view. By way of this approach, having authenticated the device, the authentication module 201 alerts the other modules, such as the image processing module 207 and comparison module 205 of such requests.

In addition, the authentication module 201 operates in connection with the communication interface 213 for receiving image and/or video data (e.g., content 111) as recorded by a plurality of cameras, a multi-camera hub, or a combination thereof. As such, the authentication module 201 facilitates storing of the content to the database 111. It is noted that content related to a common subject (e.g., event, scene, object), such as received via a single multi-camera system, may be tagged in common for storage purposes.

In one embodiment, the comparison module 205 determines a delta (variance/difference) between the data captured by a plurality of cameras. This may include, for example, performing of a vector analysis comparison between respective frames. In addition, the comparison module may determine optimal (minimal) vector differences between the pluralities of cameras. By way of illustration, the comparison module 205 determines the differences between the images and stores one of the original images (per one of the cameras) plus the delta to the content database 111. This image, corresponding to a default and/or primary image, may also be rendered to a requesting device for review by a user.

Image selection, in certain embodiments, is performed by way of an image selector 209. The image selector 209 operates in connection with the user interface module 211 for rendering of images relative to user provided input. For example, the image selector 209 responds to user input for rendering of originally captured content, i.e., as captured via a perspective of one of the cameras, plus the corresponding delta information. Also, the image selector 209 operates in connection with an image processing module 207, which enables the rendering of an interpolated view based on the available content 111.

For the purpose of illustration, the image processing module 207 generates the interpolated view based on user selection of an interpolated view or sweep between two endpoint views. In certain embodiments, the image processing module 207 processes the input provided per the selection, such as a specified angle input, perspective input, view, etc., then varies the magnitude of the difference vector associated with the required images. In the case of a selected interpolation that is representative of an angle/perspective between two camera views, the magnitude of the difference vectors of the first and second camera view is adjusted on the basis of the relative distance between the interpolated view and the first and second cameras.

In addition, the image processing module 207 also facilitates the rendering of multi-dimensional content, including three and four dimensional data. For example, the image processing module 207 is configured to control a parallax of a particular interpolated view, i.e., the amount of displacement or difference in the apparent position of the subject 117 as viewed along different lines of sight. The image processing module 207 adjust the parallax dynamically in response to a determined adjustment by the user via the user interface. Also, the image processing module 207 varies the magnitude of determined difference vectors—i.e., as generated via the comparison module 205—for generation of an interpolated view.

The image processing module 207 also operates in connection with the communication interface 213 to facilitate the transmission of interpolated content to one or more requesting user devices. This includes, for example, generation of a datagram includes information related to the primary camera and the difference vectors between it and the other cameras. By way of illustration, in the case of video content, MPEG video frames are encoded such that each line represents a moment in time, as shown in Table 1 below:

TABLE 1

Intra frame (I-frame)-rendering of a full frame of video
Prediction frame (P-frame)-this is a frame of content representing a difference between "now" (the frame to be interpolated) and the original frame
Prediction frame (predicted - this is a frame of content representing more difference between "now" and the last frame P-frame TABLE 1-continued Bi-directional frame (B-frame)-this is a frame of content that is predicted from both the previous and next fill frame. It is required for buffering to "see the future," i.e., generate the interpolation corresponding to the desired frame position.
I-frame
... etc Table 1 corresponds to I-P-B frame types that may be encoded in datagrams used for MPEG video compression. In contrast, the multi-camera analog at any instant may be generated by the module 207 as shown in Table 2 below:

TABLE 2

[MainCam + VectorToCam2 + VectorToCam3 ... etc] is a single datagram
Over Time this yields:
[MainCam + VectorToCam2 + VectorToCam3 ... etc]Time1
[MainCam + VectorToCam2 + VectorToCam3 ... etc]Time2
[MainCam + VectorToCam2 + VectorToCam3 ... etc]Time3
...
[MainCam + VectorToCam2 + VectorToCam3 ... etc]TimeN By way of illustration, MainCam corresponds to the vector associated with the primary camera. VectorToCam2-VectorToCamn corresponds to the vector from the primary camera to another of the cameras. In certain instances, the datagram may specify location and/or position information as well. The datagram for enabling conveyance of interpolated content as shown in Table 2 is similar to the I-P-B frames. The exception, however, is that wherein an MPEG datagram is generated based on time events of a single data feed, the datagram for conveyance of multi-camera content and interpolated content is based on the differences across multiple sources (e.g., cameras). It is noted that vector differences become larger in magnitude as cameras are separated. Hence, it is more efficient to determine a double (or more) delta vector from the main camera to the neighboring cameras to the endpoint cameras—i.e., corresponding to the optimal vector differences.

The datagram generated via the image processing module 207 enables proper sequencing of received content frames per the encoding presented with respect to Table 2. Thus, the content rendering module of a requesting device decodes the datagram accordingly for enabling proper rendering of the content.

In one embodiment, the context processing module 203 optionally processes context information associated with one or more cameras of a multi-camera system for capturing context information. By way of example, the context processing module 203 interprets time stamp information, location information, position information and other data captured in association with an image to support the comparing of images by the comparison module 205 for determining of delta information. By way of example, the coordinate data for a first camera and a second camera is determined based on a tag, label or metadata associated with captured video data. As such, the comparison module 205 can determine the relative distance of the cameras to one another based on the received content. The context information received is provided by one or more sensors of the camera devices. Of note, this optional execution may be coordinated by a multi-camera hub to which a plurality of cameras is connected.

In another embodiment, the context information may be interpreted to determine a common event, occurrence, venue, activity or other relationship between images. Under this scenario, images associated with the same subject of the captured content (e.g., video) are correlated despite being received from disparate data capture sources (e.g., cameras). Alternatively, the context processing module 203 may determine a common labeling or tagging of the images for enabling immediate determining of a relationship between the content capturing sources—i.e., each may be stamped with a related device and/or group identifier.

In one embodiment the user interface module 211 enables presentment of a graphical user interface for presenting content. By way of example, the user interface module 211 generates the interface in response to application programming interfaces (APIs) or other function calls corresponding to the browser application or web portal application of the user devices 101a-101n; thus enabling the display of graphics primitives. Of note, the user interface module 211 may operate in connection with the image processing module 215 to enable the rendering of interpolated content, i.e., an image.

In one embodiment, a communication interface 213 enables formation of a session over a network 109 between the interpolation platform 103 and the user device. By way of example, the communication interface 213 executes various protocols and data sharing techniques for enabling collaborative execution between a subscriber's user device 101a-101n (e.g., mobile devices, laptops, smartphones, tablet computers, desktop computers) and the interpolation platform 103 over the network 105. It is noted that the communication interface 213 is also configured to support a browser session—i.e., the retrieval of content as referenced by a resource identifier during a specific period of time or usage of the browser. The browser session may support retrieval of captured content, generation of interpolations of captured content, etc.

Figure 7:
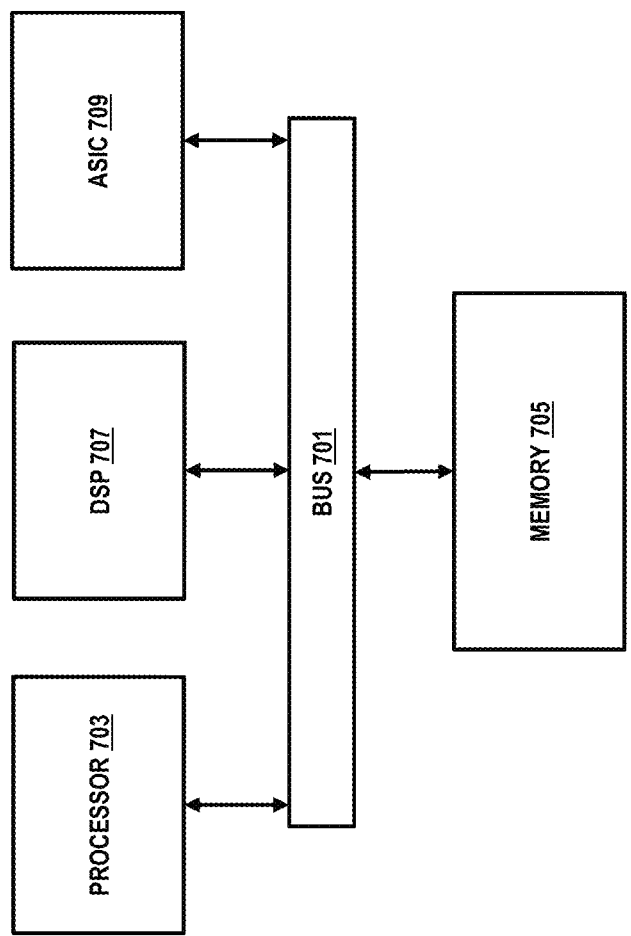
FIG. 7 is a diagram of a chip set that can be used to implement an embodiment of the invention.

FIGS. 3A-3E are flowcharts of processes for enabling users to generate an interpolated view of content based on footage captured by multiple cameras, according to various embodiments. In one embodiment, the interpolation platform 103 performs processes 300, 306, 310, 312 and 320 are implemented in, for instance, a chip set including a processor and a memory as shown in FIG. 7. For the purpose of illustration, the processes are described with respect to FIG. 1. It is noted that the steps of the processes may be performed in any suitable order, as well as combined or separated in any suitable manner.

In step 301 of process 300, the interpolation platform 103 receives a plurality of images from a plurality of video cameras providing overlapping fields of view. As noted, the overlapping fields of view are produced as a result of the cameras being directed towards a common subject or scene, i.e., subject 117. In another step 303, the interpolation platform 103 selects a camera angle that is different from angles provided by the plurality of cameras. This different angle is selected based on a user request for a unique perspective of the content that was not captured originally by the plurality of cameras. In another step 305, an interpolated image corresponding to the selected camera angle using a portion or all of the plurality of images from the plurality of cameras is generated.

In step 307 of process 306 (FIG. 3B), the interpolation platform 103 receives a request for the interpolated data corresponding to a time frame, the request indicating the camera angle that is different from angles provided by the plurality of video cameras. The platform 103 also causes a rendering of the interpolation, the plurality of images, or a combination thereof at a device based on the request, corresponding to step 309. By way of example, the interpolation platform 103 provides a user interface that enables the user to provide input for specifying the different angle. In addition, the interface may present the interpolation and/or the content corresponding to the overlapping field of view at a given point in time.

In step 311 of process 310 (FIG. 3C), the interpolation platform 103 determines vector differences between the plurality of images at respective time frames based on the angles provided by the plurality of cameras. Per step 313, the platform 103 also determines to increase or decrease the scale of the vector differences based on the different angle. As noted previously, a minimum scale of the vector differences between the plurality of cameras is preferably maintained for optimal rendering of an interpolated view. The scale of the vector differences is proportional to a difference in degree between the angle that is different and one of the angles provided by the plurality of cameras, a distance between the plurality of cameras, or a combination thereof. Of note, the angle that is different (i.e., as specified by a user) is between the angles provided by the plurality of cameras.

In steps 315 and 317 of process 312 (FIG. 3D), the platform 103 determines a distance between the plurality of cameras and calculates multiple vector differences between the data at respective time frames of each of the plurality of cameras determined to exceed a predetermined distance threshold. It is noted that because differences become larger as cameras as separated, it is more efficient to determine a double (or more) delta/vector difference from the main camera to the neighboring cameras and the endpoint cameras.

In step 319, the time frame corresponding to the request for an angle that is different than the plurality of angles provided is determined by the interpolation platform 103. As noted previously, the request for generation of interpolated content is facilitated by way of specification of the different angle as well as specification of the common moment of capture of the content for which to base the interpolation. It is noted that the video cameras may record overlapping fields of view over time. Consequently, the interpolation platform 103 determines the correct time frame for which to generate an interpolated image from among the plurality of video frames captured.

Per step 321, the platform 103 causes retrieval of the vector differences, the plurality of images, or a combination thereof based on the determination. This retrieval is based on the storing of the vector differences and the image data by the interpolation platform 103. For example, upon determining the differences between the images, the interpolation platform 103 can subsequently store one of the original images as captured by a primary/default camera plus the vector difference information associated with that camera. Once stored, this information may also be retrieved for viewing by a user having access to the platform 103 via a user interface.

In step 323 of process 320, the interpolation platform 103 generates a datagram related to the interpolated image. Per step 325, the datagram is transmitted to the device. The datagram is generated to include one of the plurality of images, a vector difference between the one image and the plurality of images, or a combination thereof. This corresponds to the exemplary encoding scheme of Table 2 as described above.

FIG. 4 is a diagram of a subject being recorded from various perspectives by different cameras of a multi-camera system, according to one embodiment. For the purpose of illustration, the diagrams are described with respect to an exemplary use case of multiple cameras 401-405 focused on a football game, where certain players are recorded over a period of time as a common subject. As such, the cameras 401-405 capture various frames, i.e., frame 409, of content over a period of time T1-TN.

By way of example, the first camera 401 captures a view of the subject 407 from a first angle/position, the second camera 403 from a second angle/position and the third camera 405 from a third angle/position. Under this scenario, the second camera 403 acts as a primary camera that serves as the source of capture of a primary image. Also, the relative distances of the cameras is as follows: a distance D1 between the first device 401 and the second device 403, a distance D2 between the second device 403 and the third device 405 and a distance D3 between the first device 401 and the third device 405.

Each of the cameras captures footage of the subject 407 from different points of view. For example, due to the position of camera 401, a frame of content corresponding to an instant of time T2 is shown to present a different perspective than a frame of content 409 as captured by the third camera 405 during the same instance. Assuming the cameras stay in a fixed position, therefore, the relative distances between them corresponds to numerous vantage points/angles during the same time frame that are not captured by the cameras.

Figure 5A:
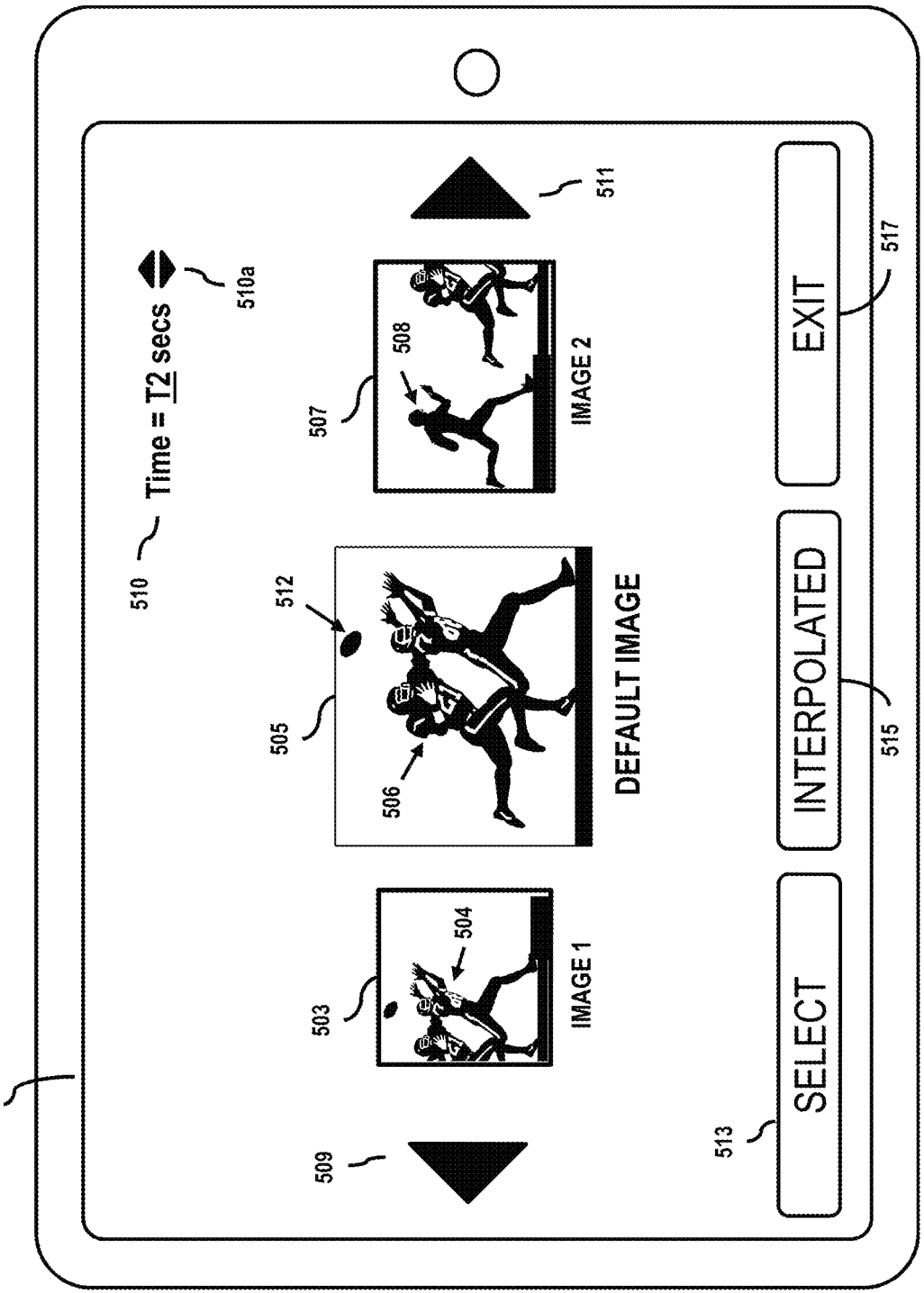
Figure 5C:
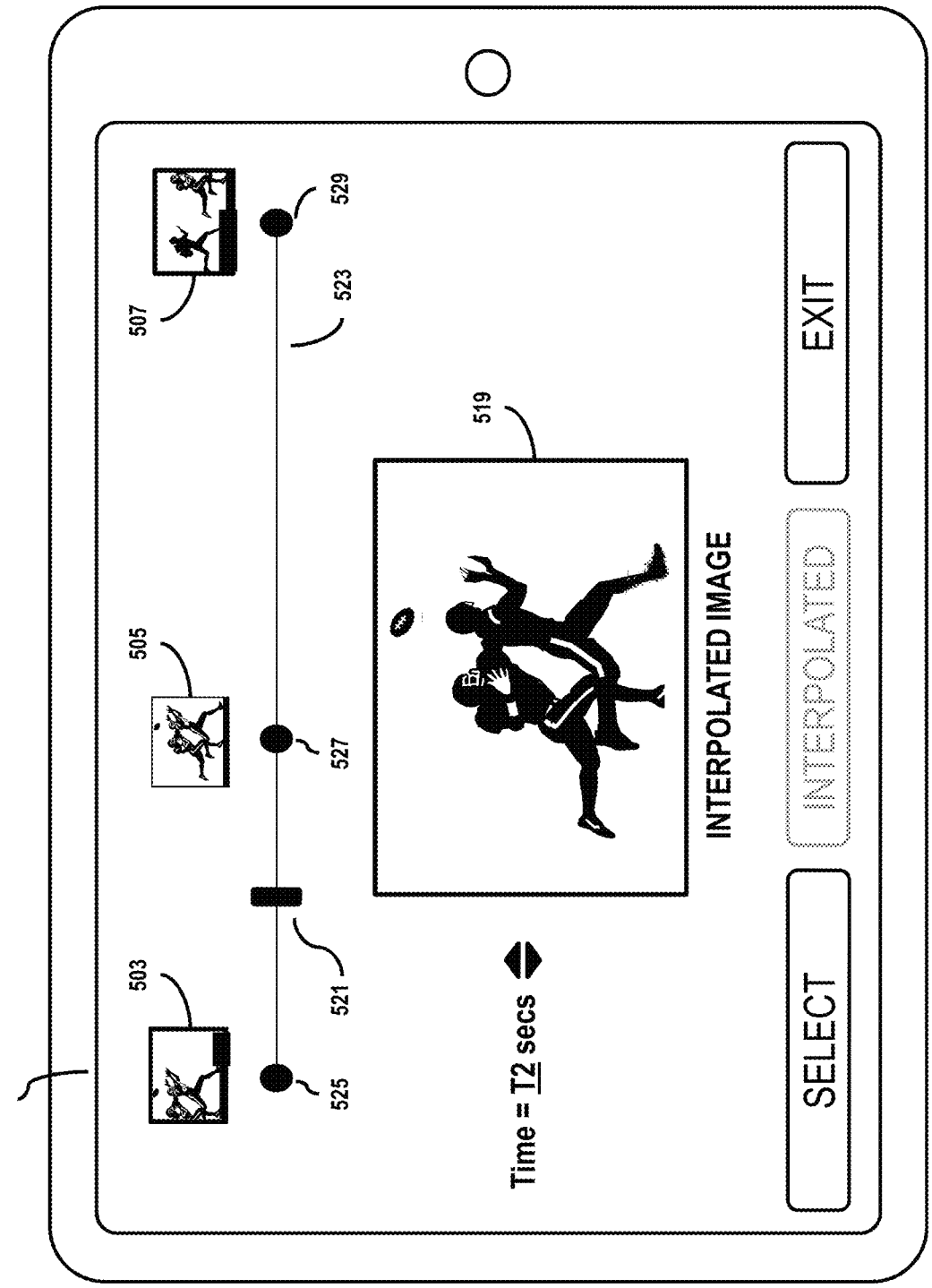

The interpolation platform 103 calculates the vector differences between the cameras 401-405 based on the relative distances D1-D3, the angles of the cameras 401-405, etc. As noted previously, the results are stored by the interpolation platform 103 along with the captured images corresponding to a given time frame. This information is then made available for view by a user from a device, as shown in FIGS. 5A-5C. In addition, the user may generate one or more interpolated views of the recorded subject 407 as image data accordingly.

FIGS. 5A-5C are diagrams of user interfaces utilized in the processes of FIGS. 3A-3E, according to various embodiments. The figures are described from the perspective of the exemplary use case above. Furthermore, the user interfaces correspond to that provided by the interpolation platform 103 for enabling user access to and generation of one or more images, interpolated views, etc.

Continuing with the example of FIG. 4, the subject is captured via the cameras 401-405 from various vantage points, and user device 500 can present, via display 501, the corresponding thumbnail images 503, 505, and 507 at various time frames. Under the scenario of FIG. 5A, default image 505, as captured via the primary camera 403 is shown. The thumbnail image 505 corresponds to a more forward facing view of the subject 407 given the orientation of the primary camera 403 during time T2. The user can expand this image by activating a SELECT action button 513, resulting in expansion of the full image rather than the thumbnail view.

Alternatively, the user can toggle between all captured views for the corresponding time period T2 by selecting back or forward scroll buttons 509 and 511 respectively. Upon selection, the various thumbnails representative of the images (e.g., Image 1 and Image 2) for all of the camera views is shown. The number of thumbnails presented therefore corresponds to the number of cameras actively recording content at the time. A time frame adjustment field 510 is made available along with a time value increase/decrease selector 510a for enabling the user to adjust the specific time frames to view, which in this example, corresponds to T2 seconds.

By way of example, thumbnail 507 corresponds to a thumbnail representative of a view (Image 2) corresponding to frame 409 as captured by the third camera 405. Thumbnail 503 corresponds to an view (Image 1) captured by the first camera 401. It is noted that the different images convey additional details related to the same scene/subject at the time. For example, Image 1 corresponding to thumbnail 503 presents additional open field and less of the defender 506 attempting to thwart the receiver 504 of the football 512. Conversely, Image 2, corresponding to thumbnail 507, shows less of the receiver 504, none of the football 512 and more of the defender 506 and another defender 508 not shown in any other view. The interpolation platform 103 is able to determine the differences between the images based on the calculated delta information.

FIG. 5B shows an expanded image 507a based upon selection of the thumbnail 507. The thumbnails 503 and 505 are also shown relative to the time frame for enabling the user to readily toggle between all views and readily call for an expanded view. The user can view images as captured by cameras 401-403 for a different time frame by adjusting the time frame adjustment field 510 or by adjusting the time value increase/decrease selector 510a. Alternative, the user can exit the interface altogether by selecting the EXIT action button 517.

When the user selects the INTERPOLATED action button 515, another interface for enabling rendering of interpolated views is presented, as shown in FIG. 5C. Under this scenario, the user is presented with a toggle button 521 as part of a slide bar 523 for enabling a user to sweep between the various captured views. For example, placement of the toggle button 521 at points 525, 527 and 529 along the slide bar correspond to the views represented by Image 1, the default image and Image 2 respectively. Hence, the corresponding thumbnails 503-507 for these images are presented along the slide bar 523 to the user for reference.

Alternatively, when the user places the toggle button 521 at a point between at least two of the captured images, the corresponding interpolated image is generated and subsequently presented. For example, placement of the toggle button 521 between Image 1 corresponding to thumbnail 503 and the default image corresponding to thumbnail 505 is correlated with a specific angular position relative to the subject by the interpolation platform. Consequently, an interpolated view 519 is rendered based on the angular position as selected by the user relative to the reference images (i.e., Image 1 and the default image) upon which the interpolation is based. The view is changed dynamically as the user adjusts the position of the toggle button 521 along the slide bar 523. This process may be repeated for different time frames accordingly, such as by adjusting the time increase/decrease selector.

It is noted that the interpolated view 519, in this example, is generated based on the various vector processing and image processing capabilities of the interpolation platform 103. As such, the interpolated view 519 represents an angle that offers the user a different vantage point of the overlapping subject matter 407. The exemplary techniques and systems presented herein enable users to generate an interpolated view on demand based on an original set of data captured by a plurality of cameras. The interpolation platform 103 accounts for the relative position, orientation, offset and angular displacement of the cameras relative to one another and the subject 407 of interest for rendering the interpolated content.

The processes described herein for enabling users to generate an interpolation view of content based on footage captured by multiple cameras may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
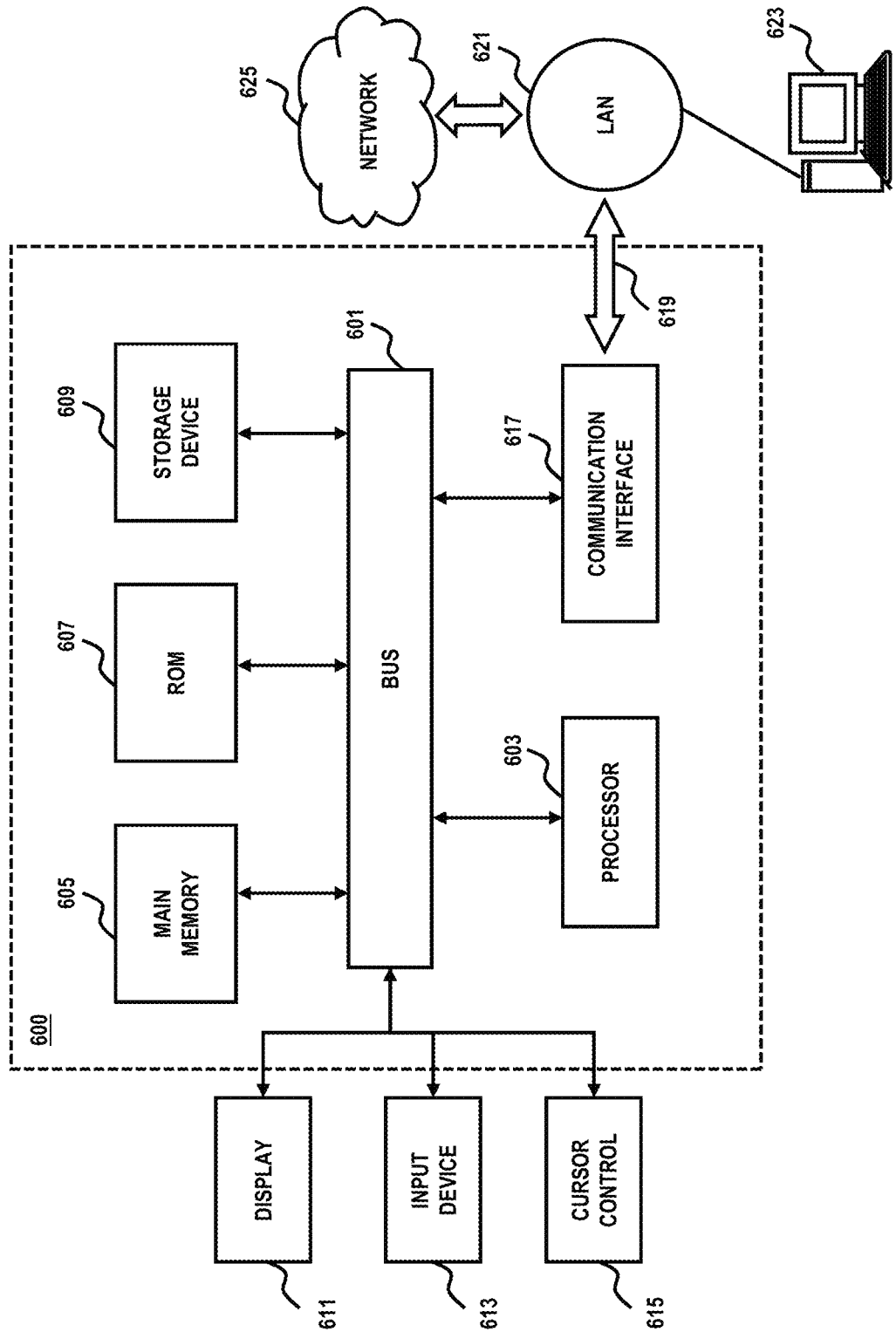
FIG. 6 is a diagram of a computer system that can be used to implement various exemplary embodiments.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIGS. 5A-5C, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set or chip 700 upon which an embodiment of the invention may be implemented. Chip set 700 is programmed to enable users to generate an interpolation view of content based on footage captured by multiple cameras as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of enabling users to generate an interpolated view of content based on footage captured by multiple cameras.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable users to generate an interpolation view of content based on footage captured by multiple cameras. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving, via a communication network at a mobile terminal, a plurality of images from a plurality of ad hoc portable video cameras that are each external to the mobile terminal and independently moved into different locations by a plurality of users and provide overlapping fields of view of one or more objects in a scene of an event;
selecting at the mobile terminal a viewing angle that is different from angles provided by any built-in cameras of the mobile terminal and the external cameras; and
generating real-time, by the mobile terminal without user intervention, an interpolated holographic video of the scene corresponding to the viewing angle by adjusting a parallax of the one or more objects in the scene with respect to the viewing angle using a portion or all of the plurality of images from the external cameras.

2. A method of claim 1, wherein the step of generating further comprises:
causing a rendering of an user interface of the mobile terminal that shows a slide bar and at least the portion of the plurality of images arranged based on the angles and corresponding to the slide bar;
receiving, via a user sweep of a toggle button on the slide bar at the user interface, an indication of the viewing angle; and
causing a rendering of the interpolated holographic video at the user interface based on the indication.

3. A method of claim 1, further comprising:
determining vector differences between the plurality of images at respective time frames based on the angles provided by the external cameras.

4. A method of claim 3, further comprising:
determining to modify a scale of the vector differences based on the viewing angle,
wherein the interpolated holographic video is based on the determination, and the event occurs outdoor.

5. A method of claim 4, wherein the scale of the vector differences is proportional to a difference in degree between the viewing angle and one of the angles provided by the external cameras, a distance between the external cameras, or a combination thereof.

6. A method of claim 1, further comprising:
causing a rendering of an user interface of the mobile terminal that shows a scroll button and a portion of the plurality of images arranged based on the angles, wherein the portion of the plurality of images are captured during an identical time frame;
receiving a user manipulation of the scroll button at the user interface as an indication of another portion of the plurality of images adjacent to the portion of the plurality of images based on the angles; and
causing a rendering of the other portion of the plurality of images at the user interface based on the indication.

7. The method of claim 1, further comprising:
determining a distance between the external cameras; and
calculating multiple vector differences between the data at respective time frames of each of the external cameras determined to exceed a predetermined distance threshold.

8. A method of claim 1, further comprising:
determining the time frame corresponding to the request; and
causing retrieval of the vector differences, the plurality of images, or a combination thereof based on the determination.

9. A method of claim 1, further comprising:
generating a datagram related to the interpolated holographic video; and
transmitting the datagram to the device,
wherein the datagram includes one of the plurality of images, a vector difference between the one image and the plurality of images, or a combination thereof.

10. A method of claim 1, further comprising:
receiving a user input for varying a magnitude of a difference vector relative to an angle between two of the external cameras; and
causing a rendering of the interpolated holographic video based on the user input.

11. An apparatus of claim 1, wherein the apparatus is further caused to:
receiving a user input for varying a magnitude of a difference vector relative to an angle between two of the external cameras; and
causing a rendering of the interpolated holographic video based on the user input.

12. An apparatus comprising:
at least one processor; and
at least one memory including computer program code for one or more programs,
the at least one memory and the computer program code configured to, with the at least one processor, cause the apparatus embedded in a mobile terminal to perform at least the following,
receive, via a communication network at a mobile terminal, a plurality of images from a plurality of ad hoc portable video cameras that are each external to the mobile terminal and independently moved into different locations by a plurality of users and provide overlapping fields of view of one or more objects in a scene of an event;
select a viewing angle that is different from angles provided by any built-in cameras of the mobile terminal and the external cameras; and
generate real-time, without user intervention, an interpolated holographic video of the scene corresponding to the viewing angle by adjusting a parallax of the one or more objects in the scene with respect to the viewing angle using a portion or all of the plurality of images from the external cameras.

13. An apparatus of claim 12, wherein the apparatus generates the interpolated holographic video by:
receiving a request for interpolated data corresponding to a time frame, the request indicating the viewing angle; and
causing a rendering of the interpolated holographic video, the plurality of images, or a combination thereof at a device based on the request.

14. An apparatus of claim 12, wherein the apparatus is further caused to:
determine vector differences between the plurality of images at respective time frames based on the angles provided by the external cameras.

15. An apparatus of claim 14, wherein the apparatus is further caused to:
determine to modify a scale of the vector differences based on the different angle,
wherein the interpolated holographic video is based on the determination.

16. An apparatus of claim 15, wherein the scale of the vector differences is proportional to a difference in degree between the angle that is different and one of the angles provided by the external cameras, a distance between the external cameras, or a combination thereof.

17. An apparatus of claim 12, wherein the apparatus is further caused to:
determine a distance between the external cameras; and
calculate multiple vector differences between the data at respective time frames of each of the external cameras determined to exceed a predetermined distance threshold.

18. An apparatus of claim 12, wherein the apparatus is further caused to:
determine the time frame corresponding to the request; and
cause retrieval of the vector differences, the plurality of images, or a combination thereof based on the determination.

19. An apparatus of claim 18, wherein the apparatus is further caused to:
generate a datagram related to the interpolated holographic video; and
transmit the datagram to the device,
wherein the datagram includes one of the plurality of images, a vector difference between the one image and the plurality of images, or a combination thereof.

* * * * *